United States Patent Office 2,779,107
Patented Jan. 29, 1957

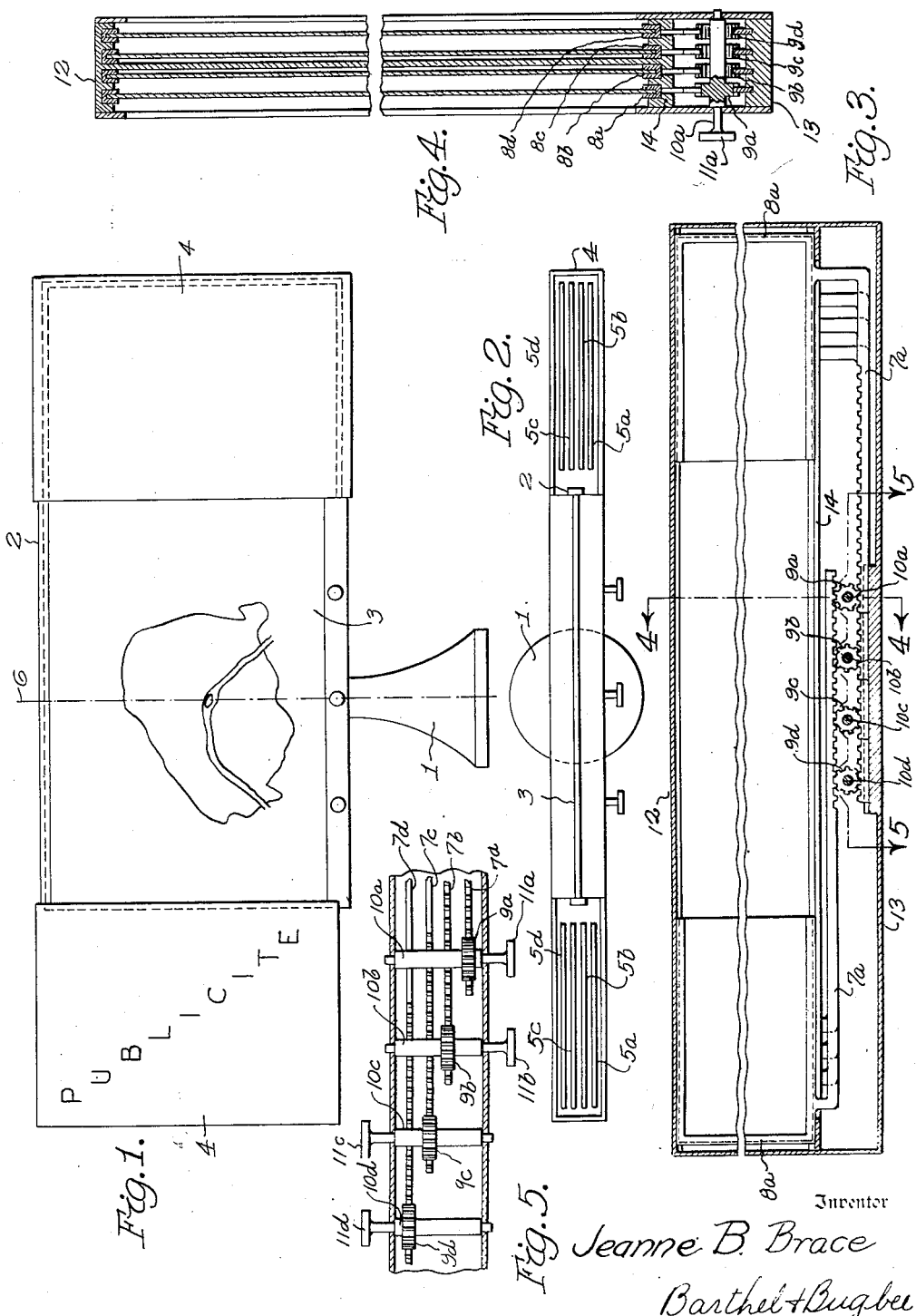

2,779,107

INFORMATIONAL AND DISPLAY DEVICE

Jeanne Bredeville Brace, Paris, France

Application December 27, 1951, Serial No. 263,663

Claims priority, application France December 30, 1950

3 Claims. (Cl. 35—53)

This invention relates to displaying and exhibiting devices, such as for indicating communication and transportation lines or other useful information on maps, charts or pictures for instructive or advertising purposes.

One object of this invention is to provide an indicating or display device for indicating quickly on maps or other pictorial displays for instruction, informational or advertising purposes, data which are not permanently inscribed on the map, picture or the like, but which are temporarily superimposed thereon by being inscribed on one or more sliding or swinging transparent panels.

Another object is to provide an indicating or display device wherein a pair of or plurality of pairs of transparent panels are moved simultaneously over the map or other pictorial illustration, which may be on only one side or upon both sides of a stationary pictorial illustration panel, the mechanism for moving these panels being selectively operable so that the user can move any desired pair of the panels over the basic pictorial illustration.

Other objects and advantages of the invention will become apparent during the course of the following description of the accompanying drawings, wherein:

Figure 1 is a front elevation of an indicating or display device, according to one form of the invention;

Figure 2 is a top plan view of the device shown in Figure 1, with the top member thereof removed to disclose the interior construction, the operating mechanism for the movable panels being omitted for purposes of simplicity;

Figure 3 is a front elevation, partly in vertical section, of the device shown in Figure 1, with the pedestal omitted, showing operating mechanism for shifting the various transparent half-panels into and out of coincidence with the stationary pictorial illustration panel or map;

Figure 4 is a central vertical cross-section taken along the line 4—4 in Figure 3; and Figure 5 is an enlarged horizontal section through the operating mechanism taken along the line 5—5 in Figure 3.

In general, the indicating or display device of the present invention consists of a stationary pictorial illustration panel with a map or picture or the like on either or both sides thereof, together with half-panels of transparent material such as glass, plastic and the like, carrying designs or inscriptions giving any complementary information, such as transportation and communication lines, important buildings, places of special interest for official, professional, military, scientific, industrial or artistic purposes.

The device is arranged either in small portable form so as to be easily carried by the individual, or mounted in enlarged form in offices, transportation terminals, hotel lobbies or other public buildings for consultation by numerous people. The transparent panels are moved to and fro by any suitable means, such as rods, cranks or winches or other mechanism, or operated by handles, or operated by motors, if desired. A considerable number of such maps or transparent panels may be superimposed upon the stationary panel or retracted into casings located beside, above or below the stationary main illustration. The transparent panels optionally carry texts, designs or advertising information. Suitable illumination is preferably provided, either by electrical or phosphorescent or fluorescent light sources or employing luminous signals.

Referring to the drawings in detail, Figures 1 and 2 show a simplified form of the invention comprising a stand or pedestal 1 on which is mounted a stationary frame or supporting structure 2 carrying a stationary pictorial illustration panel 3, such as a map, chart, picture or design, upon either or both sides, the form shown having such pictorial illustrations on both sides, as shown in Figures 2 and 3. Mounted at opposite ends of the frame or supporting structure 2 are two casings or housings 4 having openings adjacent the ends of the pictorial illustration panel 3 and containing a plurality of pairs of transparent panels 5a, 5b, 5c, 5d arranged in halves and mounted so as to slide into and out of the casings or housings 4 toward one another over the pictorial illustration panel 3 and preferably meeting at the center line 6 of the frame or supporting structure 2 or in any other proportion suitable or desired. Each one of these half panels 5a, 5b, 5c or 5d carries any complementary information, designs or color schemes which it is desired to superimpose upon the main design or pictorial illustration panel 3. In addition to the purposes mentioned above, the device may also be employed to superimpose upon a map street car or bus lines, roads, canals, railroads, theatres, office buildings, governmental buildings, hotels, transportation terminals, points of interest, or other geographical, historical, archaeological, artistic, professional or engineering information. The device may also be used for display advertising with complementary illustrations or color schemes placed on the sliding panels.

Figures 3, 4 and 5 show details of one form of mechanism for sliding the panels 5a, 5b, 5c and 5d to and fro, the panels having L-shaped racks 7a to 7d respectively attached to the panel frames 8a to 8d respectively. The racks 7a to 7d are disposed in pairs corresponding to the pairs of panels 5a to 5d respectively above and below pinions 9a to 9d meshing therewith and mounted on shafts 10a to 10d journaled in the frame structure 2 and provided with knobs or handles 11a to 11d respectively (Figure 5).

The frame or supporting structure 2 is provided with a suitable grooved top 12 and bottom 13 for the tops of the panels and the lower racks respectively, and is also provided with a grooved intermediate partition 14 for receiving the lower edges of the panel frames 8a to 8d respectively (Figure 4).

In the operation of the device, let it be assumed that the transparent half panels 5a to 5d inclusive are retracted into their respective casings or housings 4 (Figure 2), and that it is desired to bring the foremost pair of half panels 5a into coincidence with the front of the stationary pictorial illustration panel 3. The operator or user grasps the knob or handle 11a at the extreme right in Figure 3, and rotates it in a clockwise direction, thereby shifting the racks 7a so that they move toward one another. The motion of the racks 7a toward one another causes the foremost transparent panels 5a to move toward one another in front of the stationary pictorial illustration panel 3 until their adjacent edges come into contact with one another at the center line 6 (Figure 1). When the half panels 5a have been moved to this location, the user releases his grip on the knob 11a and consults the composite pictorial illustration thereby obtained as a result of the superimposition of the transparent half panels 5a upon the stationary pictorial illustration panel 3. When he has made his observations, he rotates the knob 11a in a counterclockwise direction, so as to cause the racks 7a and their connected panels 5a to move away from one another back into the casings or housings 4. In a like manner, any one of the other pairs of half panels 5b, 5c or 5d may be superimposed upon the stationary pictorial illustration panel 3, the panels 5c and 5d moving over the rearward side of the stationary panel 3, and operated by the rearward knobs 11c and 11d.

The invention is, of course, not confined to four pairs of half panels 5a to 5d but may make use of a greater or lesser number, as desired. It will also be obvious that in place of the manually-operated knobs 11a to 11d, the shafts 9a to 9d inclusive may be rotated and the panels 5a to 5d moved to and fro by means of one or more motors, combined with suitable clutches, either with or without limiting switches attached to the racks 7a to 7d so as to halt or reverse the motor or motors at the opposite ends of their paths of travel. It will also be obvious that conventional coin-operated control mechanism may be employed to control the action of the motor, so as to bring a financial return on the use of the device in public places.

In order to insure complete closure of the transparent panels, these may be provided at the tops and bottoms of their meeting edges with magnets which pull the edges together as soon as they come into proximity. Thus, it will be seen that the invention provides a convenient and quickly operative device for educational, instructional, informational or advertising purposes.

What I claim is:

1. An informational and display device, comprising a supporting structure, a pictorial illustration panel mounted on said supporting structure and carrying a pictorial illustration thereon, a housing structure mounted on said supporting structure, said housing structure having aligned part panel storage compartments spaced away from one another on opposite sides of said illustration panel, and a transparent composite panel made up of a pair of part panels of transparent material disposed in substantially the same plane and carrying complemental matter arranged to register with said illustration, said part panels being slidably mounted in said housing structure and slidable into and out of said part panel storage compartments in opposite directions into and out of edge-to-edge engagement with one another and thereby slidable into and out of registry with said illustration.

2. An informational and display device, comprising a supporting structure, a pictorial illustration panel mounted on said supporting structure and carrying a pictorial illustration thereon, a housing structure mounted on said supporting structure, said housing structure having aligned part panel storage compartments spaced away from one another on opposite sides of said illustration panel, and a plurality of transparent composite panels disposed in different parallel planes, each composite panel being made up of a pair of part panels of transparent material, said part panels being slidably mounted in said housing structure for sliding motion between said part panel storage compartments and registry with said illustration panel, each pair of part panels being disposed substantially in the same plane but different pairs of part panels being disposed in different parallel planes spaced laterally apart from one another and carrying complemental matter arranged to register with said illustration, each pair of said part panels being slidable in opposite directions into and out of edge-to-edge engagement with one another and thereby slidable into and out of registry with said illustration.

3. An informational and display device, comprising a supporting structure, a pictorial illustration panel mounted on said supporting structure and carrying a pictorial illustration thereon, a housing structure mounted on said supporting structure, said housing structure having aligned part panel storage compartments spaced away from one another on opposite sides of said illustration panel, a transparent composite panel made up of a pair of part panels of transparent material disposed in substantially the same plane and carying complemental matter arranged to register with said illustration, said part panels being slidably mounted in said housing structure and slidable into and out of said part panel storage compartments in opposite directions into and out of edge-to-edge engagement with one another and thereby slidable into and out of registry with said illustration, a rotatable member, parallel racks connected to said transparent part panels, and a pinion connected to said rotatable member and meshing with said racks.

References Cited in the file of this patent

UNITED STATES PATENTS

| 770,585 | Ikemori | Sept. 20, 1904 |
| 1,067,799 | Colley | July 22, 1913 |
| 1,375,308 | Mathes | Apr. 19, 1921 |
| 2,210,333 | Kroner | Aug. 6, 1940 |
| 2,370,305 | Guditz | Feb. 27, 1945 |
| 2,566,800 | Hutcherson | Sept. 4, 1951 |

FOREIGN PATENTS

| 23,340 | Great Britain | Oct. 22, 1906 |
| 996,138 | France | Aug. 29, 1951 |